United States Patent Office 3,160,917
Patented Dec. 15, 1964

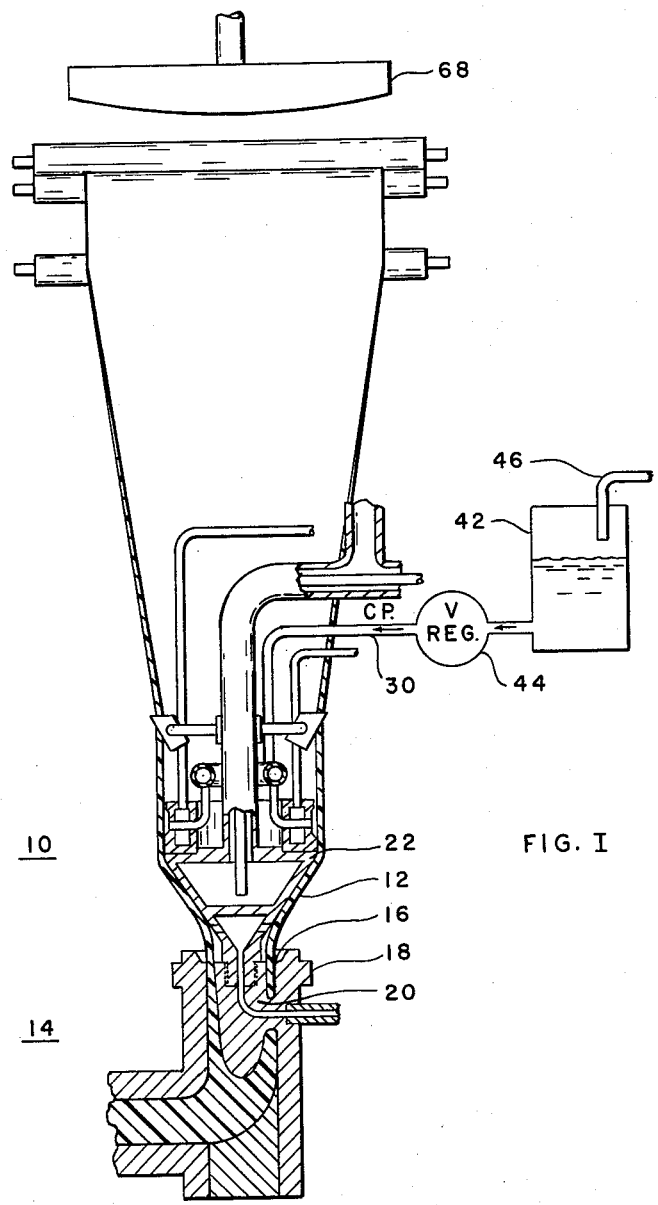
FIG. I

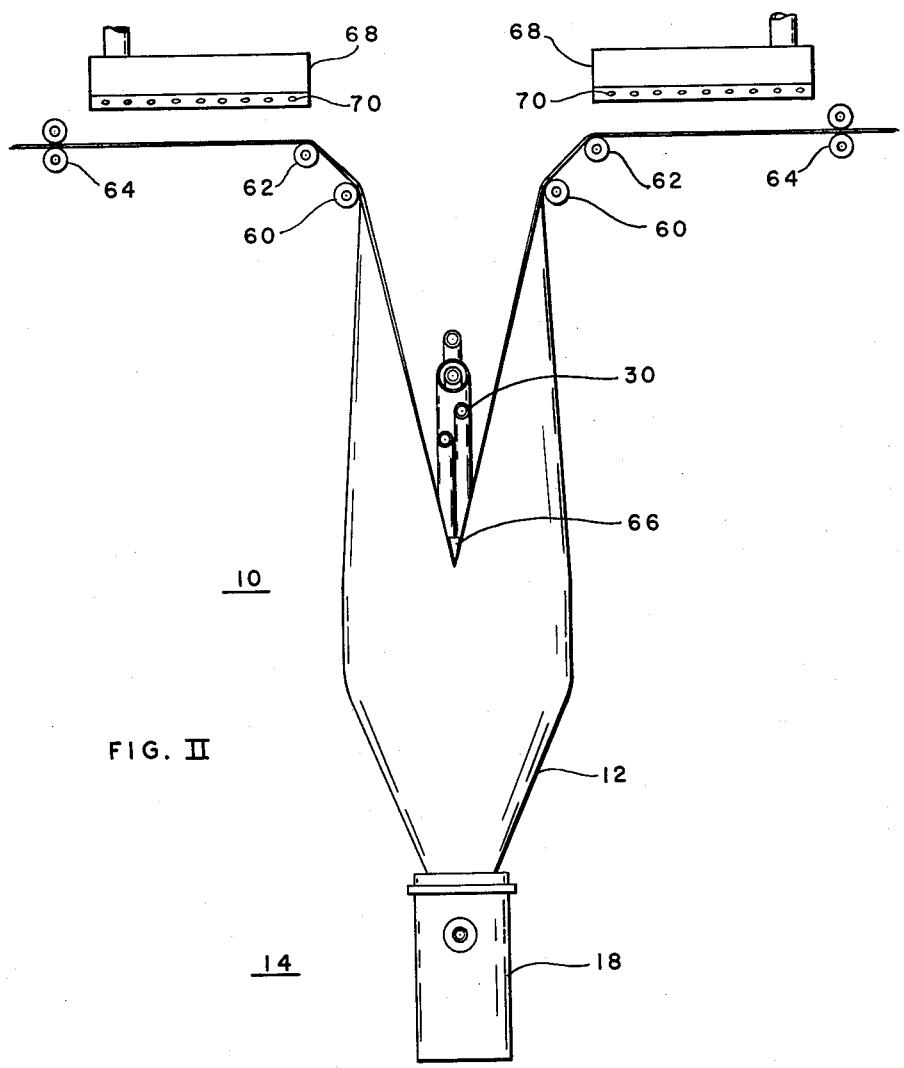

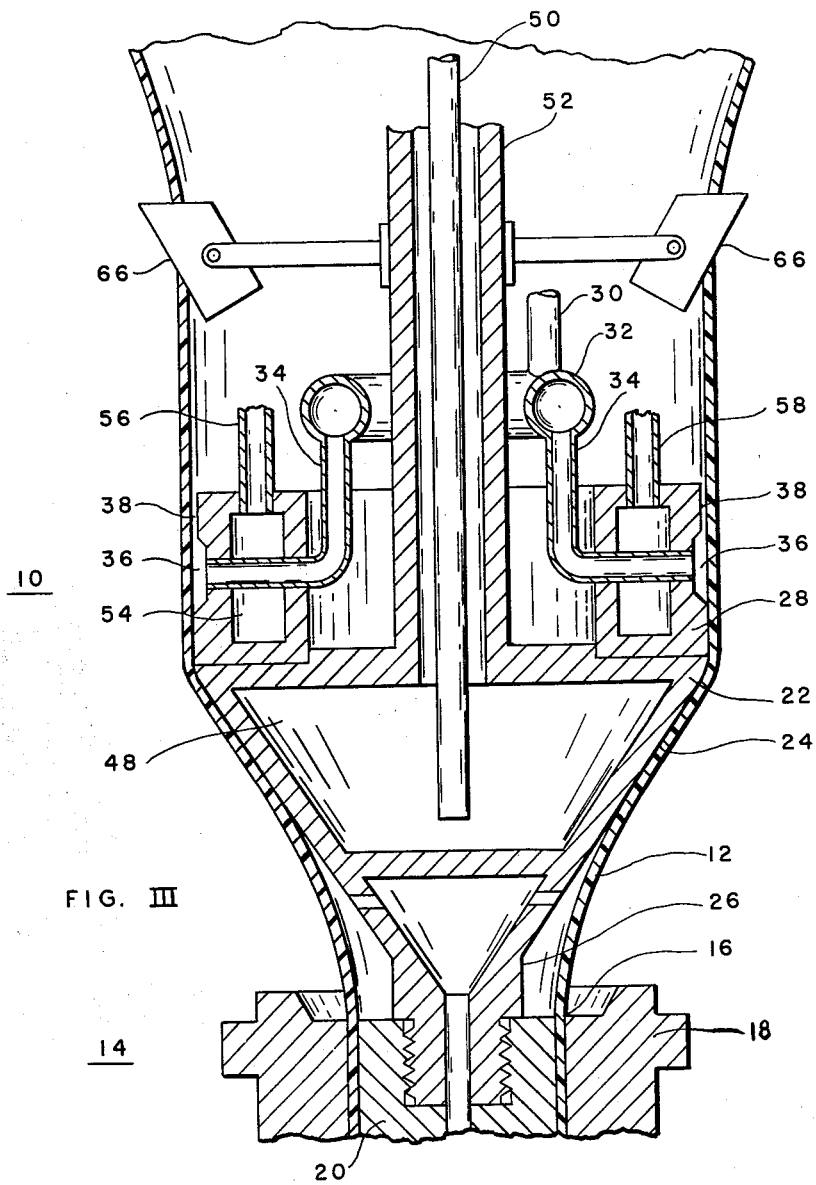
FIG. III

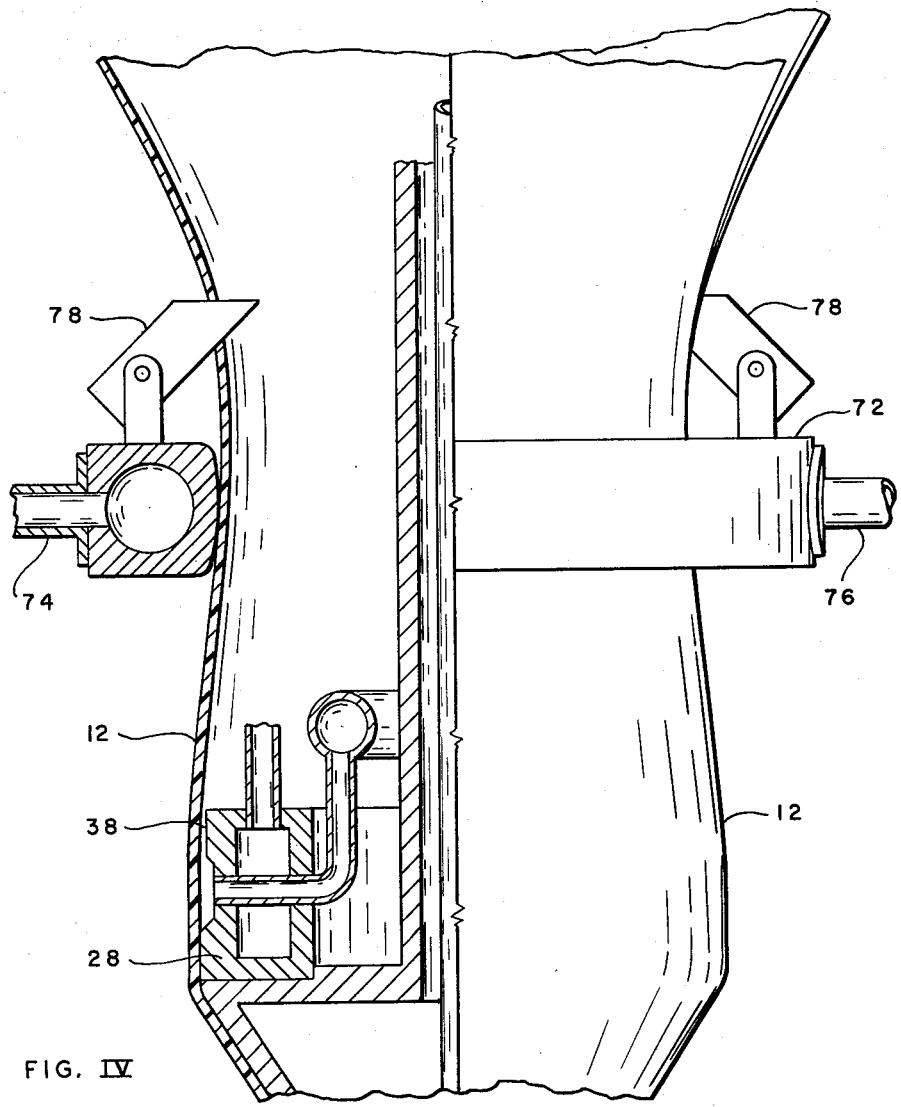
FIG. IV

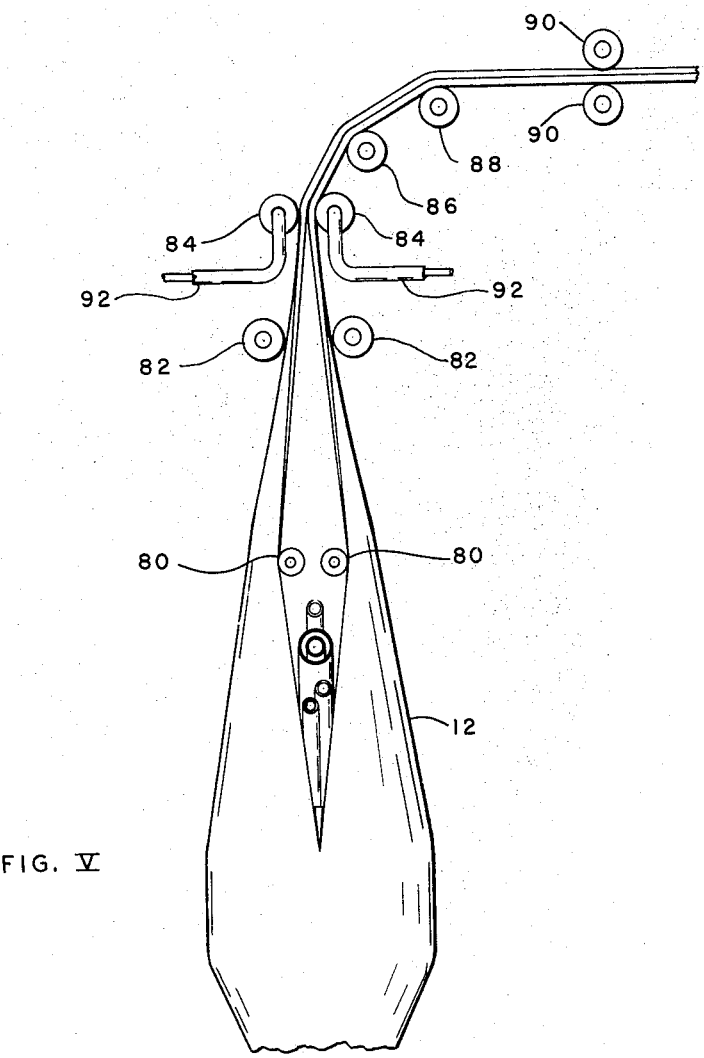
FIG. V

3,160,917
COATING OF BIAXIALLY ORIENTED FILM
Loring J. Berggren, Wilbraham, Mass., and Charles T. Hathaway, 216 Ramona Road, Danville, Calif.; said Berggren assignor to Monsanto Company, a corporation of Delaware
Filed Nov. 24, 1961, Ser. No. 154,453
2 Claims. (Cl. 18—14)

The present invention is directed to coating films and sheets constituted of thermoplastic synthetic polymeric material, and more particularly, to coating films biaxially oriented by tubular processes.

This application is a continuation-in-part of copending application S.N. 80,465, filed January 3, 1961, which describes a process designed to introduce biaxial orientation into a tubularly-shaped member of thermoplastic synthetic polymeric material by means of a rigidly constructed mandrel stationed intermediate of an annular extrusion die orifice and take-off means.

It is generally known that polymer film can be advantageously modified for many end uses by applying a coating to the film. Typical of the many advantages to be gained would be coatings adapted to provide barriers against air, moisture, abrasion, etc. Another important use has been developed for polymer films having poor heat sealability such as e.g., oriented polystyrene. Acrylic and vinyl acetate based coatings have been found to provide excellent heat-sealing properties to films that previously shriveled or decomposed upon the application of heat.

In the past, polymer films were generally coated as a separate operation by techniques, rollers, sprays and similar devices which tended to greatly increase the cost of coated polymer films. In particular, the temperature of biaxially oriented polymer films had to be maintained low during the coating and drying operations to prevent loss of orientation. These low temperature operations generally restricted the type of coating materials to those that were liquid at low temperatures and/or extended the drying cycle when solvents were used.

Accordingly, it is a primary object of this invention to provide apparatus means for coating biaxial oriented films constituted of thermoplastic synthetic polymeric material.

Other objects of the invention will in part be obvious and will in part appear hereinafter.

These and other objects of the present invention can be obtained in an apparatus designed first to introduce biaxial orientation into a tubularly-shaped member of thermoplastic synthetic polymeric material and secondly to introduce a uniform coating onto the inner surface of the oriented tubing, the said apparatus comprising a mandrel of rigid construction stationed intermediate of an annular extrusion die orifice and take-off means, the said mandrel being provided externally with a longitudinally diverging advance end of cross-sectional continuous curvature and fluid coating means located above the tapered advance end, said coating means comprising an annularly grooved rigid cylindrical section provided with means for fluid entry into said annular groove.

The following drawings are provided for the purpose of illustrating various embodiments of the present invention:

FIGURE I is a side elevation in section and with parts broken schematically illustrating an embodiment of the present invention;

FIGURE II is a partial rear elevation with parts broken schematically illustrating the same embodiment of the invention illustrated in FIGURE I;

FIGURE III is a schematic representation in section and with parts broken particularly illustrating a mandrel and die head combination which can be used in practice of the present invention.

FIGURE IV is a schematic representation in section with parts broken showing the mandrel described in FIGURE III with a subsequent cooling operation.

FIGURE V is a schematic representation with parts broken showing the mandrel described in FIGURE III with a subsequent laminating operation.

Referring to the drawings wherein like numbers refer to like parts throughout, and first to FIGURES I–III, a biaxial orientation and coating apparatus 10 is shown in conjunction with a tubular member 12 of synthetic polymeric material, the latter designed to be biaxially oriented and coated while being advanced over the former.

Specifically an extruder head 14, the remainder of the extruder not being shown, is shown having an annular die orifice 16, defined between a die head casing 18 and die core 20, through which to extrude tubular member 12. Thereafter, tubular member 12 is caused to be drawn over the exterior of mandrel 22.

Mandrel 22 is shown stationed above, and in axial alignment with the said die orifice 16 and is provided externally with an effective longitudinally tapered or diverging advance end 24 terminating in the advance direction in stationing projection 26. The effect obtained on the tapered advance end 24 then is that of a truncated cone. The tapered advanced end 24 of mandrel 22 is further provided externally with continuous curvature when considered in cross-section. In this regard, the curvature preferably contributes a peripheral outline or profile defining a circle, but it can also define various other elliptical shapes.

The advance end 24 provides the situs where orientation, both longitudinal and lateral of tube 12, takes place. The after cylindrical section 28 of mandrel 22, which is contiguous to or a rearward extension of the previously-described advance end 24, is by comparison of constant diameter and serves a dual-fold purpose as a situs for coating the inner surface of tubular member 12 and as a situs where the biaxial orientation once initiated is permanentized by chilling or cooling of tubular member 12.

The fluid coating distributing means comprising a fluid coating feed system and an annular discharge orifice or groove for coating the inner surface of the tubular member is designed for wide application in tubular biaxial orientation systems employing rigidly constructed mandrels. As shown in FIGURE III, the fluid coating material enters the fluid coating distributing means through feed pipe 30 under a low pressure and passes into the manifold 32. A plurality of manifold exit tubes 34 conduct the fluid coating material to the annular discharge orifice 36 located around the periphery of the cylindrical section 28.

The cylindrical section 28 of the preferred embodiment as shown in FIGURE III is designed such that the diameter of the mandrel defining the leaving peripheral surface 38 located immediately above the annular groove 36 is reduced to permit passage of the now coated polymer tube 12. The peripheral clearance between the leaving peripheral surface 38 and the tubular member 12, in effect, controls the thickness of the coating applied to the polymer tube 12. The coating fluid enters the fluid coating distribution means under slight pressure. A slight pressure is desirable in order to maintain constant fluid fillage throughout the fluid coating distribution means, particularly within the annular discharge orifice 36 as variations in fluid pressure within the annular discharge orifice 36 will cause uneven deposits of the coating material on the polymer tube 12. However, changes in the magnitude of the pressure employed can serve to further control the thickness of the coating for any designated peripheral clearance.

The coating fluid may be maintained under slight pressure by any suitable means such as mechanical pumps, manometer legs, gravity systems, gas pressure systems and similar devices. The preferred pressurizing means as shown in FIGURE I, is a gravity system, comprised essentially of a coating fluid reservoir tank 42 and a constant pressure outlet valve 44 for maintaining a uniform pressure within the fluid coating distributing means. The fluid level within the reservoir tank 42 is maintained by continuously replenishing fluid coating material from an external source, not shown, through pipe 46. It is usually desirable to utilize a reservoir tank of large diameter to optimize fluid level control, thereby reducing possible pressure variations throughout the fluid coating system. If desired, the temperature of the coating fluid may be increased by externally heating the reservoir tank 42.

It is not intended to place limitations on the internal configuration of the solid mandrel employed by biaxially orienting the polymer film material prior to the coating process. However, the mandrel should be provided with a plurality of temperature control zones. Different polymer materials will generally have different optimum orientation temperatures and the coating process is in some cases affected by the temperature of the polymer film or the fluid coating material. Temperature control is therefore important. The preferred mandrel shown more clearly in FIGURE III is provided with a plurality of internal temperature control zones. Heating zone 48 is located to the interior of tapered advance end 24. This expedient is designed to provide or maintain and transfer that temperature to tubular member 12 at which biaxial orientation can be introduced into the same. Stand pipe 50, integrated to a source, not shown, serves to introduce heated fluid into heating zone 48. The outer exhaust pipe 52 is installed for the purpose of making the heating fluid system of a continuous circulating nature. The secondary temperature control zone 54, located above, previously described heating zone 48, can be used to heat or cool the polymer film to an optimum temperature consistent with both the film orientation and coating operation. In order that the secondary temperature control zone can be provided continuously with fluid for obtaining and maintaining the desired temperature, supply pipe 56 and exhaust pipe 58, both of which are connected to a source of fluid, are utilized.

In order to advance tube 12 at a predetermined speed over mandrel 22, take-off means are provided, which are shown in FIGURE II, taking the form of sheet bending and support rolls 60—60 and 62—62, and pairs of pinch rolls 64—64, the pinch rolls being provided with a drive motor, or other source of power not shown.

Mandrel 22 is located intermediate, process-wise of annular die orifice 16, and the take-off means described immediately above. A film-slitting means, more particularly knives 66—66, are shown located above mandrel 22 in order that tube 12 upon leaving mandrel 22 can be slit into two equi-width sheets and made available to be advanced through the various components of the take-off means in the form of two separate single-width sheets. This prevents creasing or film distortion which would otherwise occur if the film were directed through the take-off means in tubular form. If greater sheet widths are desired, a single film-slitting knife may be readily employed. In the preferred embodiment, tubular member 12 extends a few inches above (see FIGURE III) the mandrel 22 before being cut by the film-slitting means. This is done in order to maintain a uniform clearance between the inner surface of the polymer tube 12 and the leaving peripheral surface 38 of the cylindrical section 28 since this clearance is determinant of the thickness of the particular coating. A minimum separation of about two inches between the mandrel 22 and the film-slitting means has been found to be satisfactory.

For many coatings, particularly those carried in a solvent vehicle, drying means are necessary. In FIGURES I and II drying means are provided in the form of air ducts 68—68 positioned over the coated surfaces of the individual film halves. Temperature controlled air for drying, from a source not shown, is forced through the perforated underportions 70—70 of air ducts 68—68, respectively, for drying or cooling the coated surfaces of the polymer film.

FIGURE IV illustrates a third embodiment of the mandrel orientation and coating apparatus which can be used in practice of the present invention. The mandrel 22 is the same as that previously described above but incorporates a hollow cooling ring 72 supported by means not shown located above the mandrel 22 and encompassing the outer surface of the tubular member 12 for cooling said tube after it advances above the mandrel 22. In order that the hollow cooling ring can be provided continuously with fluid coolant of the desired temperature, intake pipe 74 and exhaust pipe 76, both of which are connected to a source of coolant are utilized. The inner surface of the cooling ring 72, that is, that portion of said ring in contact with the outer surface of the tubular member 12 is polished to permit smooth passage of the polymer tube 12 through the center opening of the cooling ring. The diameter of the cooling ring 72 may be varied, but preferably the diameter of the center opening of said cooling ring should be somewhat less than the outer diameter of the tubular member 12. The advantages of the cooling ring are two-fold. First, the clearance between the tubular member 12 and the leaving peripheral surface 38 of cylindrical section 28 can be varied by moving the cooling ring up or down in relation to the mandrel 22, thereby varying the thickness of the coating applied to the inner surface of the tubular member 12. Secondly and more importantly, the fluid coating material can be applied to the tubular member 12 at much higher temperatures without loss in biaxial orientation which otherwise could occur if said tubular member were cut before it was cooled. Consequently higher melting and therefore less tacky coatings may be utilized. In addition the increased temperature of the tubular member 12 during advancement between the mandrel 22 and the cooling ring 72 enhances the drying of solvent and aqueous coating systems which may be further improved by increasing the distance between the mandrel and the cooling ring and/or applying a low vacuum at this point. A film-slitting means, more particularly a pair of knives 78—78 are shown in FIGURE IV attached to and located above the cooling ring 72 in order that the tubular member 12 can be slit and made available to be advanced through the various components of the take-off means in the form of two single-width sheets. A single knife may be employed if a larger width sheet is desired. The take-off means would be similar to that utilized for the preferred embodiment as shown and described above.

The mandrel, which can be used in practice of the present invention, is of rigid construction so as to present a solid face or surface to the tubular member of thermoplastic material wherein biaxial orientation is being introduced. The exterior shell of the mandrel which can be of unitary or divisional construction can be fabricated from rigid materials such as various metals, alloys and ceramics, which have the capacity for conducting heat, relatively uniformly and as adiabatically as possible, in order to contribute uniformity of orientation and, correspondingly, uniformity of physical properties and appearance in the final biaxially oriented film product. Materials particularly recommended for this are steel, copper, aluminum and various nickel alloys. The exterior surface should be polished in order to cut down frictional forces between this surface and the interior of the tube of film being advanced over the same.

As previously indicated, the advance end of the mandrel, that is the advance end which serves as the situs for orientation, is tapered in the direction of advance, and has a continuous outside curvature in cross-section. The after-part of the mandrel, which serves as the situs for coating the film and permanentizing the orientation, once initiated is preferably of constant diameter, and again has a continuous outside curvature in cross-section.

The overall size of the mandrel in cross-section or circumference will depend upon the internal circumference of the tubular member which is desired to be attained with orientation (stretching) while the circumference of the most advanced end can reflect the internal diameter of tubular member prior to introduction of orientation, which can be that of the tubular member upon its being extruded from the die. The angle of taper on the advanced end can vary over wide limits, depending upon the amount of longitudinal or machine direction and lateral or transverse orientation which is intended to be introduced into the tubular member. As previously mentioned, the type of coating fluid utilized will vary dependent on the type of polymer film being oriented and the purpose to be served. In illustration of the coating operation, a mandrel such as shown in FIGURE III, having a diameter of 7.500 inches before the annular discharge orifice and a diameter of 7.494 inches above said orifice; the width of the annular discharge orifice in the longitudinal direction of the mandrel being approximately three-fourths of an inch with a mid depth of approximately one-eighth of an inch, and a taper angle for the mandrel advance end of 60° can be used to orient and coat a tubular member of isotactic polystyrene having a Staudinger molecular weight of 55,000–70,000, an initial gauge of 40 mil with an interior circumference of 4.7 inch at a final advance speed of 55 feet per minute. The coating fluid is comprised of 25 parts (by weight) of polyvinyl acetate dissolved in 75 parts (by weight) of ethyl alcohol which is applied to the polystyrene surface to take advantage of its peculiar moisture resistant and heat sealing properties. After the polystyrene tube leaves the mandrel its gauge (thickness) has been reduced to 1 mil and it has an internal circumference of 23.5 inches, both in permanentized condition with a coating thickness of approximately 0.0001 to 0.0002 inch. The resulting film when tested according to ASTM–D1504 exhibits 200–600 p.s.i. orientation stress in the machine direction and 100–300 p.s.i. in the lateral. The force of adhesion of the coating polystyrene surface heat-bonded at temperatures of approximately 190° F. to 250° F. to the surface of an uncoated surface of polystyrene film is in the order of 5–10 pounds per square inch. In carrying out this illustrative orientation and coating operation, the temperature of the coating fluid is maintained at approximately 140° F. by varying the secondary temperature control zone within the range of 60–175° F. while varying the heating zone between 225–245° F.

The preferred location of the mandrel is such that the longitudinal axis of the same is axially aligned with the axis of the die from which the tubular member is being extruded. As indicated above, if the coating material were such as to require higher fluidizing temperatures, the orientation of the polystyrene film would be more advantageously permanentized by a subsequent cooling operation such as the cooling ring described above.

The mandrel of the present invention can also be used to apply coatings, as a center layer, to films to produce a sandwich construction. FIGURE V illustrates this modification wherein a mandrel such as shown in FIGURE III is used in conjunction with laminating means. In this embodiment, a pair of separating rolls 80—80 is employed to part the halves of the tubular member 12 to permit piping access to the mandrel described in FIGURE III. The tubular halves are then directed toward each other by a pair of alignment rolls 82—82 and pressed together by the subsequently located laminating rolls 84—84 to form a continuous flat sandwich construction. Support rolls 86 and 88 and take-off rolls 90—90 convey the laminated sheet to a pack-out station not shown. In some cases lamination can be improved by heating the laminating rolls 84—84 by utilizing pipes 92—92 to circulate a heating medium through said laminating rolls. In this manner, a film laminate having excellent moisture-proof properties can be produced.

An illustration of a laminated product produced by this process would be a pair of polystyrene sheets having a central layer comprised of five parts (by weight) of a fatty acid amide in admixture with ninety-five parts (by weight) of paraffin wax.

The operation of the biaxial orientation apparatus of the present invention in its most generic sense involves advancing the tubular member to be oriented, after extrusion of the same, over the mandrel, where it is first biaxially oriented and then coating the inner surface of the same while the orientation is permanentized by cooling. Thereafter the tubular member is caused to be slit and formed into one or more single-width flat sheets, in which form they are either laminated or individually directed through take-off means to eventuate as laminates or individually coated sheets of polymer film. Advance of the tubular member, and later the coated flat sheet of synthetic thermoplastic material being biaxially oriented, as previously prescribed, is effected by the take-off means which includes one or more prime movers or driving means.

During operation of the presently sponsored apparatus, time and temperature are important considerations. While these will vary according to the identity of the thermoplastic material being subjected to orientation, the coating fluid to be applied, and in a lesser degree, the amount of orientation designed to be introduced, nevertheless it can be broadly stated that orientation is introduced at a temperature above about the glassy transition temperature $T_{(g)}$ of the given thermoplastic material while the coating fluid can be applied above or below said glassy transition temperature, the orientation temperature will depend upon whether the material is of the non-crystallizable nature as in the case of atactic polystyrene, low density polystyrene, polyvinyl chloride, etc., or a crystallizable nature such as in the case of isotactic polystyrene, linear polyethylene, polypropylene, etc. In all cases, the orientation step and the coating step should not be carried out at a temperature which exceeds the melting point for the synthetic polymer material being oriented and coated, that is the temperature where it advances to a liquid state.

The permanentizing step, which is designed to stabilize orientation once introduced, is carried out at a temperature below the glassy transition temperature $T_{(g)}$ and varies according to the synthetic plastic material involved. Illustrative of this; polystyrene, polyethylene and polyvinyl chloride undergo transitions in the temperature region $T_{(g)}$ in the neighborhood of 190° F. The coating operation can be carried out before or after the permanentizing step depending on the melting point or optimum drying temperatures for the coating material. If the melting point or optimum drying temperatures of the coating material are above the temperature required for permanentizing the orientation of the film, the coating material would be applied before the permanentizing step by the use of the cooling ring. On the other hand, if the melting or drying point of the coating material is at or below the optimum permanentizing temperature range, the coating operation and permanentizing step can take place at the same portion of the mandrel in accordance with the preferred embodiment.

The residence time during which the thermoplastic material is subjected to the orientation coating and permanentizing steps will again depend on the physical and chemical characteristics of the material. Then the residence time, which is reflective of the natures of both the thermoplastic material and coating material involved, will be indicative of the speed of advance for the said material being subjected to biaxial orientation and coating. Apparatus consideration such as the size of the mandrel, and specifically the size and contour of the annular groove around the periphery of the mandrel, must also be taken into consideration in choosing speed of advance.

The sponsored apparatus contributes a combined biaxial orientation surface coating operation which is simple in operation and serves to minimize temperature control coating problems. Additionally, the simplicity of the apparatus serves to reduce both operating cost and capital when compared to other systems utilizing a separate and subsequent coating operation.

It will thus be seen that the objects set forth above, among those made apparent from the preceding description are efficiently attained and, since certain changes may be made in carrying out the above method and in the construction set forth without departing from the scope of the invention, it is intended that all matter contained in the above description shall be interpreted as illustrative and not in a limiting sense.

What is claimed is:

1. Apparatus adapted for coating biaxial oriented tubular-shaped members of thermoplastic synthetic polymeric material, comprising a mandrel of rigid non-porous construction stationed intermediate of an annular extrusion die orifice and take-off means, the said mandrel being provided externally with a longitudinally diverging advance end of cross-sectional continuous curvature, fluid coating means located on said mandrel above the diverging advance end, said coating means comprising an annularly grooved, rigid cylindrical section provided with means for the entry of a liquid coating material into said annular groove, the diameter of the cylindrical section extending rearwardly from said annular groove being reduced and coating fluid pressure control means adapted to adjust the pressure of the liquid coating material existing from said coating means; said mandrel being provided internally with a plurality of temperature control zones.

2. The apparatus according to claim 1 wherein cooling means are stationed intermediate, the mandrel and take-off means, said cooling means comprising a hollow ring in movable spacial relationship to said mandrel shaped to encompass the tubular-shaped member of thermoplastic material and having an inlet and outlet to the hollowed portion of said ring for the circulation of a cooling medium; the temperature of the center opening of the hollow ring being less than the maximum diameter of the mandrel.

References Cited in the file of this patent

UNITED STATES PATENTS

| | | |
|---|---|---|
| 1,196,648 | Bleecker | Aug. 29, 1916 |
| 1,601,686 | Henderson | Sept. 28, 1926 |
| 2,280,709 | Lichtblau | Apr. 21, 1942 |
| 2,632,205 | Fitz Harris | Mar. 24, 1953 |
| 2,641,022 | Kress | June 9, 1953 |
| 2,832,994 | Ahlich et al. | May 6, 1958 |
| 2,848,747 | Dixon | Aug. 26, 1958 |
| 2,955,321 | Fortner et al. | Oct. 11, 1960 |
| 2,968,067 | Long | Jan. 17, 1961 |
| 2,987,765 | Cichelli | June 13, 1961 |
| 2,987,767 | Berry et al. | June 13, 1961 |
| 3,074,108 | Wiley et al. | Jan. 22, 1963 |
| 3,090,991 | Hathaway | May 28, 1963 |

FOREIGN PATENTS

| | | |
|---|---|---|
| 226,211 | Great Britain | June 11, 1925 |
| 506,687 | Italy | Dec. 24, 1952 |

UNITED STATES PATENT OFFICE
CERTIFICATE OF CORRECTION

Patent No. 3,160,917 December 15, 1964

Loring J. Berggren et al.

It is hereby certified that error appears in the above numbered patent requiring correction and that the said Letters Patent should read as corrected below.

Column 1, line 33, after "by" insert -- dipping --; column 3, line 20, for "by" read -- for --; line 48, for "adbvance" read -- advance --; column 8, lines 2 and 3, for "existing" read -- exiting --.

Signed and sealed this 11th day of May 1965.

(SEAL)
Attest:

ERNEST W. SWIDER
Attesting Officer

EDWARD J. BRENNER
Commissioner of Patents